United States Patent [19]

Koppens

[11] Patent Number: 4,497,244
[45] Date of Patent: Feb. 5, 1985

[54] DEVICE FOR COVERING FOODSTUFF WITH GRANULAR AND/OR POWDERY MATERIAL

[75] Inventor: Wilhelmus F. A. Koppens, Bakel, Netherlands

[73] Assignee: Koppens Machinefabriek B.V., Netherlands

[21] Appl. No.: 459,852

[22] Filed: Jan. 21, 1983

[51] Int. Cl.³ ............................................. B05C 19/00
[52] U.S. Cl. .................................... 99/494; 99/450.1; 118/16; 118/24
[58] Field of Search ...................... 99/450.1, 494, 516, 99/345; 426/292, 293, 296, 289; 118/16, 24, 25, 308, 312; 222/161, 196, 200; 209/381, 920

[56] References Cited

U.S. PATENT DOCUMENTS 3,547,075 12/1970 Johnson ............................ 118/24 X
3,759,218 9/1973 Korstvedt ......................... 118/24 X
4,245,581 1/1981 Spencer .............................. 99/494 X
4,333,415 6/1982 Miller et al. ...................... 118/24 X

FOREIGN PATENT DOCUMENTS 7810080 4/1980 Netherlands ......................... 99/494

Primary Examiner—Timothy F. Simone
Attorney, Agent, or Firm—Nilsson, Robbins, Dalgarn, Berliner, Carson & Wurst

[57] ABSTRACT

The invention relates to a device for covering foodstuff with granular and/or powdery material comprising a frame, a bunker supported by said frame receiving a supply of granular and/or powdery material and means for displacing the foodstuff along a path extending below an outlet port of the bunker, whereby below the outlet port a sieve plate having a plurality of apertures is arranged and the device comprises means for displacing the material flowing out of the bunker in a direction opposite the direction of displacement of the foodstuff during operation.

7 Claims, 1 Drawing Figure

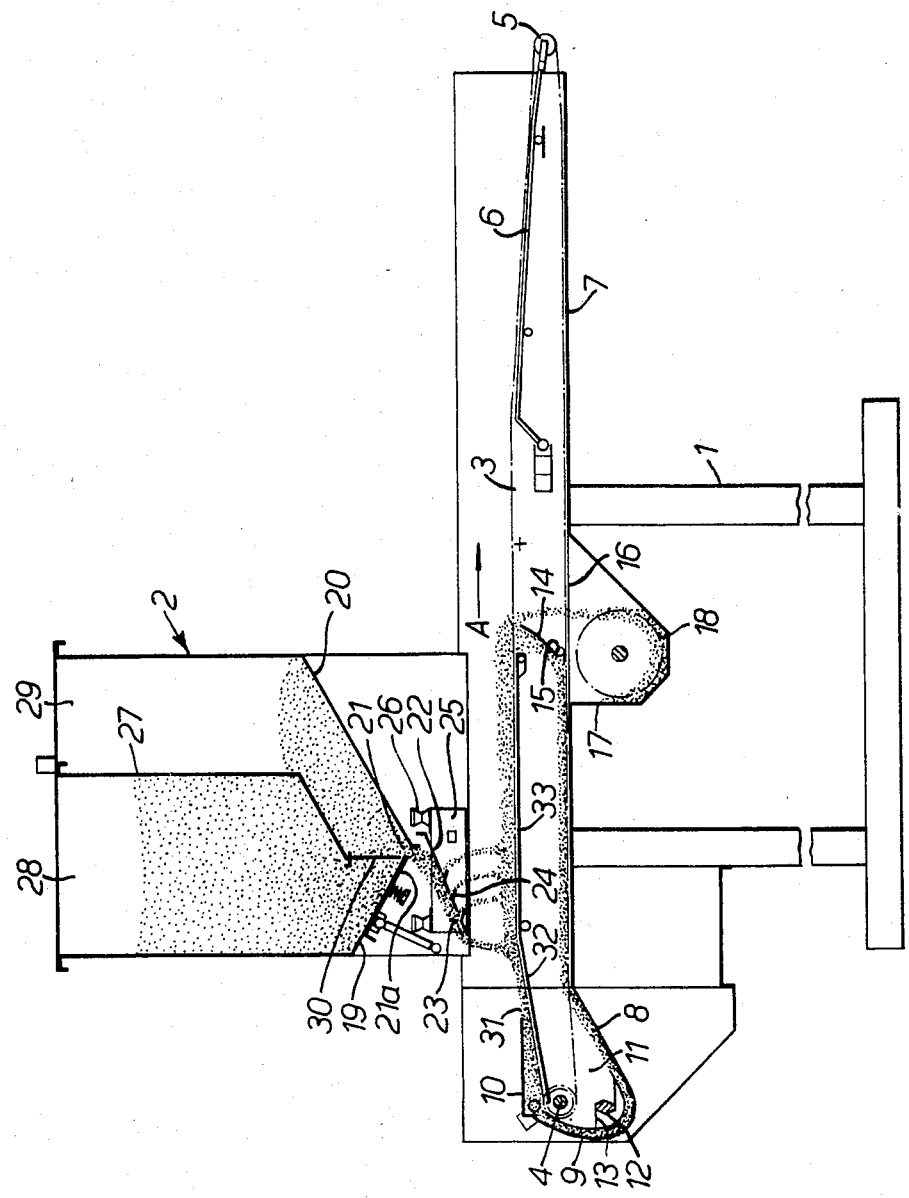

DEVICE FOR COVERING FOODSTUFF WITH GRANULAR AND/OR POWDERY MATERIAL

The invention relates to a device for covering foodstuff with granular and/or powdery material comprising a frame, a frame-supported bunker receiving a stock of granular and/or powdery material and means for displacing the foodstuff along a path extending beneath an outlet port of said bunker.

Foodstuff such as croquettes, chicken legs and the like have, in general, to be dusted with so-called breadcrumbs, which material is to include many different kinds of granular and/or powdery material. This material is dusted onto the foodstuff after the foodstuff is provided with an adhesive surface layer, frequently formed by white of egg. In many cases the so-called bread-crumbs are formed at least for the major part by coarse granular material, which is comparatively brittle. In many cases this material will also contain a given amount of fine constituents and in the devices employed hitherto these fine constituents are frequently first to come into contact with the foodstuff, which is thus covered by the fine constituents and the coarse constituents can thus no longer adhere to the foodstuff.

A first object of the invention is to ensure satisfactory adhesion of the coarser constituents to the foodstuff.

According to the invention this can be achieved in that below the outlet port a sieve plate having a plurality of apertures is arranged and the device is provided with means to displace the material flowing out of the bunker in a direction opposite the direction of displacement of the foodstuff during operation.

When using the construction embodying the invention the fine constituents tend to move through the apertures in the sieve plate, whereas the coarse constituents will move along the sieve plate in the direction towards the foodstuff to be dusted and will be first to come into contact herewith so that the foodstuff will, at least for the major part, be covered with the coarse constituents, which can satisfactorily adhere to the adhesive outer layer of the foodstuff, whilst subsequently any free spaces between the coarse constituents can be filled up by the fine material streaming through the apertures of the sieve plate.

It is furthermore desirable that the dusting material should be treated most carefully in order to avoid as far as possible fragmentation of the coarse constituents of the material.

According to a further aspect of the invention an endless, pervious belt is provided to this end for displacing the foodstuff with the aid of the upper run of the belt, said upper run moving by at least part of its length along a closed plate as well as the subjacent portion of the lower run, whilst near the end of the endless belt where the foodstuff is fed to the belt a chamber is arranged below the belt, said chamber comprising a rotor provided with blades.

By using such a construction the material can drop down across the belt near the end of the plate located below the upper run and be carried along at least partly by the lower run of the belt to be dispensed in the chamber. Out of the chamber the material can be thrown onto the upper run of the belt by the blades of the rotor. In practice it has been found that by using such a construction fragmentation of the coarse grains is avoided to an appreciable extent.

According to a further aspect of the invention fragmentation of the coarse grains can be effectively counteracted further by dividing the bunker into two compartments separated from one another near the lower side of the bunker by a pivotable flap.

In one compartment a given stock of the material can be stored, whereas the material utilized during operation flows through the other compartment. When the supply of material in the compartment passing the stream drops below a given value, the pivotable flap will automatically open under the action of the weight of the material in the other compartment so that automatic supplementation of the material flowing out during operation is obtained.

The invention will be described more fully hereinafter with reference to an embodiment of a device in accordance with the invention shown schematically in the accompanying FIGURE partly in a cross-sectional view.

The device shown in the FIGURE comprises a frame 1 supporting a bunker 2 and an endless conveyor belt 3. The pervious conveyor belt 3 is preferably composed of pivotally coupled bars extending in the longitudinal and transverse directions of the belt. Near one end the conveyor belt is supported by a drivable shaft 4 and near the other end by a guide roller 5. A portion of the upper run of the conveyor belt extending away from the driving shaft 4 passes along a closed plate 33, which is first slightly inclined upwards away from the shaft 4 and goes over subsequently into a horizontal part. The portion of the upper run of the belt adjoining the roller 5 is furthermore supported by a grid-shaped member 6. The lower run of the conveyor belt 3 is supported by a horizontal plate 7. At a given distance from the shaft 4 this plate goes over into a downwardly inclined plate 8, which establishes a connection between the plate 7 and an upwardly curved plate 9, the upper edge of which is located at a given distance above the shaft 4. The upwardly inclined part of the upper run of the conveyor belt 3 is partly covered by a horizontal plate 10 located at a given distance above the upper run.

The chamber 11 bounded by the plates 8 and 9 and located below the part of the lower run of the belt 3 adjoining the shaft 4 is equipped with a rotor comprising a shaft 12 extending parallel to the shaft 4 and blades 13 of slightly elastic material fastened to said shaft. The shaft 12 can be rotated in clockwise direction with the aid of driving means (not shown). The shaft 4 can be rotated so that during operation the upper run of the belt 3 is displaced in the direction of the arrow A.

Viewed in said direction of displacement indicated by the arrow A a flap 14 is arranged near the rear end of the plate 33 below the upper run of the belt 3, said flap being adjustable about a shaft 15 arranged near the lower edge of the flap and extending transversely of the intended direction of displacement of the conveyor belt.

The part of the bottom plate 7 located behind the shaft 15 as viewed in the direction A has a passage 16 giving access to a gutter 17 arranged below the plate 7 and accommodating a worm 18 extending transversely of the longitudinal direction of the gutter and being rotatable with the aid of driving means (not shown in detail).

It will furthermore be apparent from the FIGURE that the bottom of the bunker 2 has a slightly funnel-like shape and the edges of two downwardly inclined, converging bottom plates 19 and 20 of the bunker determine an outlet port 21. The size of the passage of this outlet port can be set with the aid of a slide 21a, which is slidable along the bottom plate 19 and can be set in a plurality of positions.

Below the outlet port 21 is arranged a sieve plate 23, which is downwardly inclined away from its end near the outlet port in a direction opposite the direction of displacement of the upper run of the belt 3 indicated by the arrow A. The sieve plate has a few elongate holes 23 extending at least substantially parallel to and transversely of the direction of displacement of the belt 3. Viewed in the direction of the arrow A downwardly and rearwardly inclined guide strips 24 located below the plate 22 adjoin the front edges of said elongate holes, said strips being integral with the plate 22. The sieve plate may, as an alternative, be formed by a perforated plate.

The sieve plate 22 is supported by a vibrating device 25, which is coupled with the frame with the aid of elastic suspension members 26.

From the FIGURE it will furthermore be apparent that the bunker 2 is divided with the aid of a partition 27 into two compartments 28 and 29 so that the capacity of compartment 28 is considerably higher than that of compartment 29.

At the lower edge of the partition 27 is hanging a flap 30 of slightly resilient material, which is freely hanging down from the lower edge of the partition 27 so that in the normal position in which the flap 30 extends vertically the lower edge of the flap 30, as viewed in the FIGURE, is located at the level of the left-hand boundary edge of the opening 21 so that the flap 30, so to say, separates the compartment 28 from the outlet port 21.

The gutter 17 communicates through a duct (not shown in detail) in which conveying means are accommodated, with the upper part of the compartment 29 of the bunker 2.

In operation the endless conveyor belt 3 is moved so that the upper run of the belt travels in the direction of the arrow A, whilst the shaft 12 is rotated in clockwise direction and the sieve plate 22 is caused to vibrate with the aid of the vibratory device 25. The foodstuff to be processed such as croquettes, chicken legs or the like provided with a slightly adhesive coating, for example, a white-of-egg layer are placed with the aid of transport means (not shown) in the proximity of point 31 on a layer of bread crumbs lying on the upper run of the conveyor belt 3 so that these foodstuffs together with the layer of bread crumbs 32 on the conveyor belt are displaced in the direction of the arrow A. At the same time bread crumbs are flowing out of the compartment 29 through the outlet port 21 onto the vibrating sieve plate 22. When the bread crumbs move along the sieve plate 22 in a direction at least substantially opposite the direction of movement of the foodstuff indicated by the arrow A, the fine constituents of the bread crumbs tend to flow away through the passages 23 in the sieve plate, whereas the coarse constituents travel as far as beyond the end of the sieve plate and subsequently drop down. It will be obvious that in this way the foodstuff displaced with the aid of the conveyor belt 3 in the direction of the arrow A will be contacted first by the coarse constituents of the bread crumbs and only then by the fine material flowing through the passages 23 of the sieve plate 22. Since the coarse constituents are first to come into contact with the objects to be covered, they can effectively adhere to these objects, whilst any free space left between these coarse constituents on the foodstuff can be filled up with the fine constituents of the bread crumbs arriving later.

The objects thus covered with bread crumbs are further displaced in the direction of the arrow A together with the bread crumbs. When the rear end of the plate 33 is reached, the bread crumbs will drop down through the pervious belt 3 so that only the objects covered with bread crumbs will be delivered by the belt 3 in the direction towards the roller 5, where the objects can be passed on to a packing machine or a further transport member or the like.

The bread crumbs passing across the belt 3 near the rear end of the plate 33 is divided, as is indicated in the FIGURE, into two streams, i.e. a first stream passing through the opening 16 to the gutter 17 and a second stream arriving, viewed in the direction of the arrow A, at the part of the bottom plate 7 located in front of the flap 14. The ratio between these two streams can be adjusted at will be setting the position of the flap 14.

The material flowing into the gutter 17 will be supplied with the aid of the worm 18 to the end of the gutter which communicates through the transport duct (not shown) with the top end of the compartment 29 of the bunker 2 so that this material is again fed to the compartment 29 of the bunker 2.

The bread crumbs falling on the plate 7 are carried along by the lower run of the belt 3 moving along said plate in the direction towards the chamber 11 located below the front end of the lower run of the belt 3. From this chamber 11 the material is slung upwards with the aid of the rotating blades 13 along the guide wall 9 and arrives at the front end of the upper run of the conveyor belt 3, where a layer of bread crumbs is formed which is moved along by this upper run of the belt 3. Since the bread crumbs are conducted to the chamber 11 at a given distance in front of the point where the lower run is going over to the upper run and are subsequently thrown up by the blades 13, a gradual displacement of the bread crumbs is obtained so that fragmentation of the coarse constituents of the bread crumbs is avoided as far as possible.

The material supplied from the gutter 17 to the compartment 29 can again flow away through the outlet port 21. When the level of the material in the compartment 29 becomes too low, the flap 30 will slightly deflect under the action of the weight of the material located in the stock compartment 28 so that material can flow from the compartment 28 towards the outlet port. When the level of the material in the compartment 29 thus rises, the flap 30 is urged back. It can thus be ensured that always a relatively small amount of the material contained in the bunker is curculating, which also counteracts an undesirable diminution of the circulating material.

The figures used in the claims are only meant to explain more clearly the intention of the invention and are not supposed to be any restriction concerning the interpretation of the invention.

I claim:

1. A device for covering foodstuff with bread-crumbs or the like including granular and powdery material, said device comprising:
 a support frame;
 a bunker means mounted on said support frame for containing a supply of the bread-crumbs and including an outlet for the bread-crumbs;
 conveyor means for displacing the foodstuff along a path below the outlet of said bunker means;

a sieve plate means for mounting between the outlet and the conveyor means, the sieve plate means defining a plurality of spaced-apart substantially parallel elongate openings lying one behind the other and extending transversely of the direction of displacement of the foodstuff on the conveyor means; and vibration mounting means for vibrating the sieve plate means independently of said bunker means, in a position downwardly inclined away from the outlet of the bunker means in a direction opposed to the direction of displacement of the foodstuff on the conveyor means to supply the bread-crumbs to the conveyor means whereby substantially larger granular bread-crumbs are supplied to foodstuff on the conveyor means followed by powdery material for the effective coating of the foodstuff.

2. A device according to claim 1 further including guide strip means affixed below the sieve plate to extend in the direction of the foodstuff on the conveyor means.

3. A device according to claim 1 wherein said conveyor means comprises an endless, pervious belt for displacing the foodstuff, said belt including an upper run and a closed plate, the upper run moving over the closed plate, and a lower run open to pass the so-called bread-crumbs.

4. A device according to claim 3 further including a chamber below the belt, and a rotor in said chamber, the rotor extending near the front end of the endless belt upwardly beyond the upper run of the belt.

5. A device according to claim 3 further including a run control-flap affixed below the upper run of the belt for dividing the stream of material passing through the upper run into two parts.

6. A device according to claim 1 wherein the bunker is divided by a partition into two compartments, and further includes a deflectable flap separating one compartment from the other near the underside of the bunker.

7. A device according to claim 6 wherein the flap comprises a flexible plate hanging down from a lower edge of the partition, the free lower end of the plate being located near the outlet of the bunker so that one compartment is in open communication with the outlet port and the other compartment is separated from the outlet port by said flap.

* * * * *